United States Patent [19]

Jagger

[11] 4,283,735
[45] Aug. 11, 1981

[54] METHOD AND APPARATUS FOR SELECTIVELY DELETING DURING VIDEO TAPE RECORDING

[76] Inventor: David Jagger, 80 Rock Ridge Rd., Fairfield, Conn. 06430

[21] Appl. No.: 77,663

[22] Filed: Sep. 21, 1979

[51] Int. Cl.³ .......................................... H04N 5/785
[52] U.S. Cl. ...................................... 358/4; 358/10; 358/139; 358/188; 360/33
[58] Field of Search ................. 358/4, 8, 127, 10, 139, 358/160, 165, 167, 185, 188, 198, 21, 31; 360/11, 14, 33, 35, 69, 71, 72.2, 74.4, 61; 179/100.1 PS, 100.1 R, 100.1 VC, 1 VC

[56] References Cited

U.S. PATENT DOCUMENTS

| | | | |
|---|---|---|---|
| 2,761,897 | 9/1956 | Jones | 179/100.1 VC |
| 3,541,453 | 11/1970 | Vanderpoel et al. | 358/188 |
| 4,000,517 | 12/1976 | Brickerd, Jr. | 360/61 |

FOREIGN PATENT DOCUMENTS 47-12293   4/1972   Japan ........................................ 358/10

OTHER PUBLICATIONS

Heller, "What's New in Commercial Killers", Tech. Rpts., Radio Electronics, 8/55, pp. 50-51.

Primary Examiner—Raymond F. Cardillo, Jr.
Attorney, Agent, or Firm—Martin Novack

[57] ABSTRACT

A technique is provided for deleting those portions of a video program which are in color, thereby allowing a monochrome movie or the like to be continuously recorded on video tape without interruption. Since station breaks and commercials are almost invariably in color, the automatic deletion of the color portions of a broadcast serve to effectively delete those portions of the broadcast which are not the desired monochrome movie or other monochrome broadcast. The disclosure is applicable for use in conjunction with a video tape recorder having a pause mode of operation. The presence of color burst is detected in received television signals. Means responsive to the detection of color burst are provided for generating a deleting signal. The deleting signal is then used to activate the pause mode of the video tape recorder. A further disclosed feature prevents undue video tape recorder head wear and tape wear by preventing the video tape recorder from remaining in the pause mode for an indefinite period if and when the broadcasting station returns to color programming.

3 Claims, 2 Drawing Figures

METHOD AND APPARATUS FOR SELECTIVELY DELETING DURING VIDEO TAPE RECORDING

BACKGROUND OF THE INVENTION

This invention relates to video recording systems and, more particularly, to an improved apparatus and method for deleting commercials and other unwanted broadcast video when video taping a monochrome television program.

Video tape recorders have recently gained widespread commercial acceptance. Video tape recorders are conventionally provided with a "pause" control which is typically utilized by one viewing the program being recorded in order to delete commercials and other extraneous broadcast information, such as station breaks, etc. During a "pause", the tape does not advance, but the heads continue to scan over the tape, so that a degree of head wear and tape wear occur.

One of the desirable features of conventional video tape recording machines is that programs can be recorded while the video tape machine is unattended. For example, the machine may be started and then left unattended to record an entire movie while the owner sleeps. Typically, the machine will run to the end of the tape and then turn off automatically. In some video tape recording machines, a programming capability is provided whereby the machine automatically turns on and off at preselected times. In either case, an unattended machine will record an entire broadcast segment, without regard to the nature of the programming being recorded. A significant disadvantage of unattended recording is that the movie or other program is interrupted by station breaks and commercials. In addition to the disturbing nature of the interruptions, the station breaks and commercials can consume as much as twenty percent of programming time. This is quite wasteful of available tape time and could cause part of the desired programming to be missed, especially when attempting to record a long movie on a machine having a tape format of only two or three hours maximum.

It is an object of the present invention to provide an apparatus and method which provides partial solution of prior art problems by automatically deleting commercials and station breaks from a monochrome television program being recorded.

SUMMARY OF THE INVENTION

In accordance with the present invention, applicant provides a technique for deleting those portions of a video program which are in color, thereby allowing a monochrome movie or the like to be continuously recorded on video tape without interruption. Since modern station breaks and commercials are almost invariably in color, the automatic deletion of the color portions of a broadcast serve to effectively delete those portions of the broadcast which are not the desired monochrome movie or other monochrome broadcast.

More particularly, the present invention is applicable for use in conjunction with a video tape recorder having a pause mode of operation. In accordance with the invention, there is provided an apparatus and method for automatically deleting, from the television signals being recorded by the recorder, color portions of received television signals, while allowing recording of monochrome portions of received television signals. In accordance with the apparatus of the invention, there are provided means for detecting the presence of color burst in the received television signals. Means responsive to the detection of color burst are provided for generating a deleting signal. Means responsive to the deleting signal are then provided for activating the pause mode of the video tape recorder.

In accordance with a feature of the preferred embodiment of the invention, timing means are provided, the timing means being responsive to the color burst detecting means for generating an indication of the continuous presence of color video for more than a predetermined time. Means responsive to this indication are provided for inactivating the deleting signal until the video tape recorder has stopped recording. This feature of the invention prevents undue video tape recorder head wear and tape wear by preventing the video tape recorder from remaining in the pause mode for an indefinite period if and when the broadcasting station returns to color programming.

Further features and advantages of the invention will become more readily apparent from the following detailed description when taken in conjunction with the accompanying drawings.

DESCRIPTION OF THE PREFERRED EMBODIMENT

Figure 1:
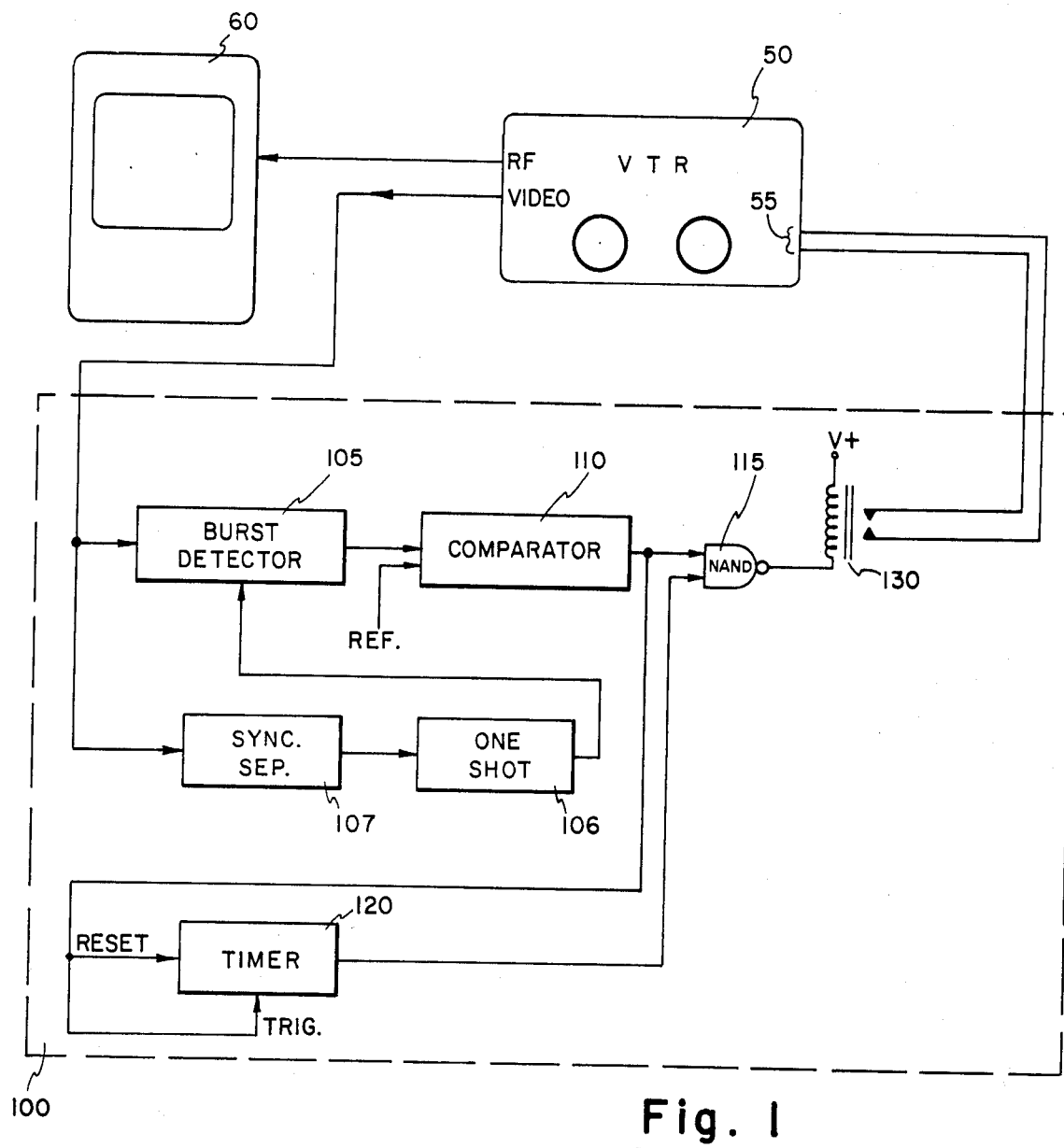
FIG. 1 is a block diagram of an embodiment of an apparatus of the invention, and which can be used to practice the method of the invention.

Referring to FIG. 1, there is shown a block diagram of an apparatus 100 in accordance with an embodiment of the invention. The apparatus is shown in dashed enclosure, and is seen to operate in conjunction with a video tape recorder 50 and a television receiver 60. Both of these units may be of the conventional type which are in widespread use. The video tape recorder 50 is typically provided with a remote pause control 55; i.e., a switch coupled by wire to the video tape recorder which allows the user to switch the machine to its "pause" mode. The most common use of the pause mode is, as discussed above, the deletion of commercials and station breaks from a television program being recorded.

In the FIG. 1 embodiment, the television signal derived at video tape recorder 50, and being recorded thereby, is illustrated as being coupled to both television receiver 60 and to the circuitry 100 in accordance with the invention. In circuitry 100 the television signal is coupled to a burst detector 105 which is operative to detect color burst at the beginning of each television scanline. Burst detector 105 is enabled for an appropriate period during the beginning of each scanline by the output of one-shot multivibrator 106. The one-shot 106, which in the present embodiment generates a pulse 3 microseconds long, is triggered by the trailing edge of the television horizontal sync pulse, this being obtained from the television signal using sync separator 107. Voltage comparator 110 compares the output of burst detector 105 to a reference threshold level, and if the output of burst detector 105 exceeds the threshold a logic level signal is coupled from voltage comparator 110 to NAND gate 115.

The output of voltage comparator 110 is also coupled to a timer 120 whose output is another input to gate 115.

The timer 120 is reset by the input from voltage comparator 110, and it has a characteristic time of 6 minutes. The output of NAND gate 115 is coupled to a relay 130 which operates to close the contacts of the remote pause control switch 55 of the video tape recorder 50.

In operation, the output of NAND gate 115 will be low only when both inputs to NAND gate 115 are high. A low output from NAND gate 115 activates relay 130 which, in turn, activates the pause control of video tape recorder 50. To better understand operation, assume that a monochrome television program is being recorded. In such instance, no burst will be detected and the output of voltage comparator 110 will be low. This means that the output of NAND gate 115 will be high and the pause control of the video tape recorder will not be activated. Also, a low output of voltage comparator 110 continuously resets the timer 120 and keeps its output low. Accordingly, it is seen that during a monochrome television program, both inputs to NAND gate 115 are low, and the pause control of video tape recorder 50 is not activated, thereby allowing recording of the monochrome television program.

When a color television program is received, the output of voltage comparator 110 will go high. A high on the timer reset pin allows its output to go high and begin its timing period. The two high inputs to NAND gate 115 will cause activation of the video tape recorder pause control, thereby preventing recording of the color television program; e.g. color advertisements or station breaks which occur periodically during a monochrome movie. If, however, the color program lasts for more than six minutes, the resultant output of timer 120 will produce a low output. This, in turn, prevents the output of NAND gate 115 from thereafter going low and activating the pause control. Thus, if at the end of a monochrome movie a station returns to color programming, the video tape recorder would be prevented from remaining continuously in the pause mode, which might otherwise possibly occur for several hours. This prevents the unnecessary head and tape wear that could be caused by remaining in the pause mode for an extended period of time. Typically, if color programming resumes after the desired monochrome program is recorded, the video tape will run to its end while continuing to record, whereupon the video tape recorder will automatically shut off. (In commercially available "programmable" recorders, the recorder can shut itself off at some predetermined time after the conclusion of a program and then turn itself on again at some later time to record a second program. In such case the timer 120 will be reset by the absence of any video, which is interpreted as monochrome by the burst detector.)

Figure 2:
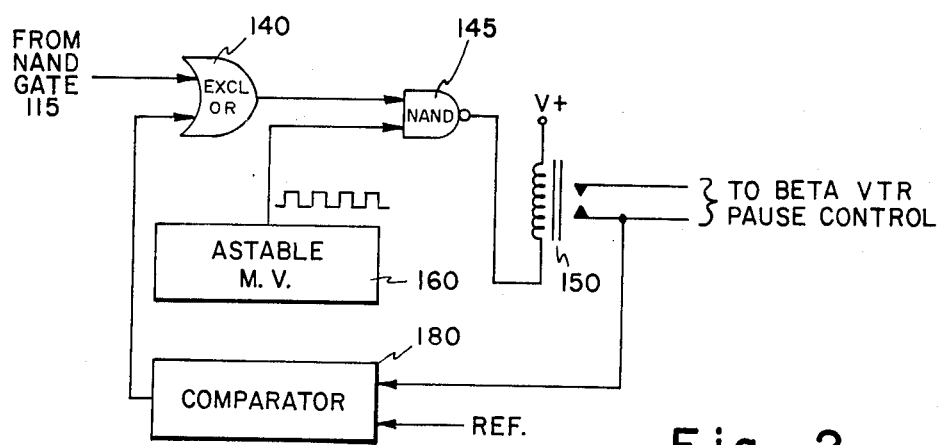
FIG. 2 is a block diagram of a variation of the FIG. 1 embodiment.

Referring to FIG. 2, there is shown a variation of the embodiment of FIG. 1, which can be utilized when the video tape recorder 50 of FIG. 1 is of the type which requires a momentary closure of its remote pause control contacts to initiate a pause. This type of operation is found, for example, in certain "beta" format video tape recorders. In these machines, an internal latch circuit in the recorder maintains the pause condition until the next momentary closure of the pause control contacts releases the machine into its record mode. For use in conjunction with this type of video tape recorder, the adaptor of FIG. 2 may be employed. In the FIG. 2 version, the output of NAND gate 115 (FIG. 1) is coupled to exclusive NOR gate 140 whose output is, in turn, coupled to NAND gate 145. The other input to NAND gate 145 receives the output of an astable multivibrator 160. The output of NAND gate 145 is coupled to relay 150 which activates the pause control of the video tape recorder. The other input to exclusive NOR gate 140 is coupled to a contact of one of the leads coupled to the video tape recorder remote pause control via comparator 180.

Operation of the circuitry of FIG. 2 is as follows: The circuitry of "beta" format video tape recorders is such that the tip connector of the remote pause plugs thereof have a relatively high voltage thereon when the machine is in a pause and a relatively low voltage (e.g. 1.3 to 1.8 volts) when the machine is in a record mode. This relatively high or low voltage level is converted to a TTL level by comparator 180. The exclusive NOR gate 140 generates a high output when both its inputs are the same and a low output when its inputs are different. Accordingly, when the output of NAND gate 115 (FIG. 1) indicates that the pause control should be activated (i.e., a low output, as previously described), both inputs to exclusive NOR gate 140 will be low, therefore producing a high input to NAND gate 145. The astable multivibrator 160 generates a continuous string of pulses which go high and then low, every 300 milliseconds in the present embodiment.

Accordingly, the next positive-going pulse from astable multivibrator 160 will cause the output of NAND gate 145 to go low, thereby activating the relay 150 and closing the contacts of the video tape recorder pause control. The outputs of NAND gate 145 will stay low for 300 milliseconds, whereupon the output of NAND gate 145 will again go high by virtue of the astable multivibrator output going low. The resultant momentary closure of the contacts will place the video tape recorder machine in its pause mode.

As above stated, the voltage on the switch contact coupled to one of the inputs to exclusive NOR gate 140 (via the comparator) will now go high, so that the output of exclusive NOR gate 140 will return to a low level. This will cause the output of NAND gate 145 to return to a high level regardless of the status of the pulses from astable multivibrator 160. When monochrome programming resumes, the output of NAND gate 115 (FIG. 1) will go high so that the inputs to exclusive NOR gate 140 will once more be the same, thereby causing momentary operation of the relay 150, in the manner previously described, so as to return the video tape machine to its record mode.

I claim:

1. For use in conjunction with a video tape recorder having a pause mode of operation, apparatus for automatically deleting from the television signals being recorded by said recorder, the color portions of received television signals while allowing recording of monochrome portions of received television signals, comprising:
    means for detecting the presence of color burst in the received television signals;
    means responsive to the detection of color burst for generating a deleting signal;
    timing means, responsive to the color burst detecting means, for generating an indication of the continuous presence of color video for more than a predetermined time;
    means responsive to said indication for preventing generation of said deleting signal; and
    means responsive to said deleting signal for activating the pause mode of said video tape recorder.

2. Apparatus as defined by claim 1 wherein said means responsive to said deleting signal comprises a relay coupled to the remote pause control of said video tape recorder.

3. Apparatus as defined by claim 1 wherein said video tape recorder is of the beta format and wherein said means for activating said pause mode comprises means for momentarily activating the remote pause control of said video tape recorder.

* * * * *